United States Patent
Cai et al.

(10) Patent No.: US 9,262,268 B2
(45) Date of Patent: Feb. 16, 2016

(54) METHOD TO DISTRIBUTE USER DATA AND ERROR CORRECTION DATA OVER DIFFERENT PAGE TYPES BY LEVERAGING ERROR RATE VARIATIONS

(71) Applicant: Seagate Technology LLC, Cupertino, CA (US)

(72) Inventors: Yu Cai, San Jose, CA (US); Ning Chen, San Jose, CA (US); Yunxiang Wu, Cupertino, CA (US); Erich F. Haratsch, San Jose, CA (US); Earl T. Cohen, Cupertino, CA (US); Timothy L. Canepa, Los Gatos, CA (US)

(73) Assignee: Seagate Technology LLC, Cupertino, CA (US)

( * ) Notice: Subject to any disclaimer, the term of this patent is extended or adjusted under 35 U.S.C. 154(b) by 110 days.

(21) Appl. No.: 14/173,108

(22) Filed: Feb. 5, 2014

(65) Prior Publication Data

US 2015/0178149 A1 Jun. 25, 2015

Related U.S. Application Data

(60) Provisional application No. 61/918,952, filed on Dec. 20, 2013.

(51) Int. Cl.
*G06F 11/10* (2006.01)
(52) U.S. Cl.
CPC .......... *G06F 11/108* (2013.01); *G06F 11/1068* (2013.01); *G06F 11/1048* (2013.01); *G06F 11/1072* (2013.01)

(58) Field of Classification Search
CPC . G06F 11/1068; G06F 11/10; G06F 11/1072; G06F 11/1048; G06F 11/1044; G11C 2029/0411; G11C 29/00; G11C 29/52; G11C 29/42; H03M 13/35
USPC .......................................................... 714/766
See application file for complete search history.

(56) References Cited

U.S. PATENT DOCUMENTS

| | | | |
|---|---|---|---|
| 8,433,979 B2 | 4/2013 | Blaum et al. ................... 714/770 |
| 8,533,550 B2* | 9/2013 | Khan ............................ 714/746 |
| 8,572,311 B1 | 10/2013 | Shalvi et al. .................. 711/103 |
| 8,578,127 B2 | 11/2013 | Thatcher et al. .............. 711/202 |
| 8,589,761 B2* | 11/2013 | Cronin et al. ................. 714/763 |
| 8,732,557 B2* | 5/2014 | Ratnam et al. ................ 714/773 |
| 9,047,214 B1* | 6/2015 | Northcott |
| 2013/0268724 A1 | 10/2013 | Seo et al. ...................... 711/103 |
| 2014/0189421 A1* | 7/2014 | Werner et al. ................ 714/6.21 |
| 2014/0245108 A1* | 8/2014 | Gaertner et al. ............. 714/773 |
| 2015/0154069 A1* | 6/2015 | Tuers et al. ................... 714/773 |
| 2015/0193302 A1* | 7/2015 | Hyun et al. ................... 714/764 |

\* cited by examiner

*Primary Examiner* — James C Kerveros
(74) *Attorney, Agent, or Firm* — Christopher P. Maiorana, PC

(57) ABSTRACT

An apparatus includes a memory and a controller. The memory includes a plurality of memory devices. Each memory device has a plurality of page types. The plurality of page types are classified based on error rate variations. The controller may be configured to write user data and error-correction data to the memory. The user data and the error-correction data are organized as a super-page. The super-page includes a plurality of sub-pages. The plurality of sub-pages are written across the plurality of memory devices such that the plurality of sub-pages are stored using more than one of the plurality of page types.

20 Claims, 13 Drawing Sheets

| DIE 0 | DIE 1 | DIE 2 | DIE 3 | ... | DIE N-1 | DIE N | DIE N+1 | |
|---|---|---|---|---|---|---|---|---|
| | | | | | | | PARITY | PAGE N-1 |
| | | | | | | S-PAGE-3 | PARITY | |
| | | | | | S-PAGE-3 | S-PAGE-2 | PARITY | |
| | | | | S-PAGE-3 | S-PAGE-2 | S-PAGE-1 | PARITY | |
| | | | S-PAGE-3 | S-PAGE-2 | S-PAGE-1 | S-PAGE-0 | PARITY | ... |
| | | S-PAGE-3 | S-PAGE-2 | S-PAGE-1 | S-PAGE-0 | | PARITY | |
| | S-PAGE-3 | S-PAGE-2 | S-PAGE-1 | S-PAGE-0 | | | PARITY | PAGE 3 |
| S-PAGE-3 | S-PAGE-2 | S-PAGE-1 | S-PAGE-0 | | | | PARITY | PAGE 2 |
| S-PAGE-2 | S-PAGE-1 | S-PAGE-0 | | | | | PARITY | PAGE 1 |
| S-PAGE-1 | S-PAGE-0 | | | | | | PARITY | PAGE 0 |

METHOD TO DISTRIBUTE USER DATA AND ERROR CORRECTION DATA OVER DIFFERENT PAGE TYPES BY LEVERAGING ERROR RATE VARIATIONS

This application relates to U.S. Provisional Application No. 61/918,952, filed Dec. 20, 2013, which is hereby incorporated by reference in its entirety.

FIELD OF THE INVENTION

The invention relates to storage systems generally and, more particularly, to a method and/or apparatus for distributing user data and error correction data over different page types by leveraging error rate variations.

BACKGROUND

As NAND flash memory continues to be scaled down, reliability of flash memory continues to decrease. Conventional RAID (redundant array of independent drives)-like technology selects a page of the same page number in a number of memory blocks from different dies to form a super-page (S-page). Part of the S-page is user data and part of the S-page structure is parity data, which is calculated from the user-data to protect the user data. By leveraging error rate variations of different dies, the worst die can be largely protected if the whole physical flash page on the worst die fails to be corrected. A potential problem with the conventional technique is that the physical flash pages taken from different dies to form the S-page are in the same relative location inside the respective blocks. Because the "sub-pages" of a conventional S-page are in the same location inside the respective blocks, the physical layout architecture is the same and programming order is also the same. Thus, the error rate of different sub-pages in different dies can still have some correlations. In particular, the sub-pages may suffer from the same program interference and the same circuit level noise due to the same design layout architecture. For example, error rates for border pages, even/odd pages, and least significant bit/most significant bit (LSB/MSB) pages are different, which could cause the codeword failure rate to be different.

It would be desirable to have a method and/or apparatus for distributing user data and error correction data over different page types by leveraging error rate variations.

SUMMARY

The invention concerns an apparatus including a memory and a controller. The memory includes a plurality of memory devices. Each memory device has a plurality of page types. The plurality of page types are classified based on error rate variations. The controller may be configured to write user data and error-correction data to the memory. The user data and the error-correction data are organized as a super-page. The super-page includes a plurality of sub-pages. The plurality of sub-pages are written across the plurality of memory devices such that the plurality of sub-pages are stored using more than one of the plurality of page types.

BRIEF DESCRIPTION OF THE FIGURES

Embodiments of the invention will be apparent from the following detailed description and the appended claims and drawings in which:

FIG. 11 is a diagram illustrating still another example programming method in accordance with an embodiment of the invention.

DETAILED DESCRIPTION OF THE EMBODIMENTS

Embodiments of the invention include providing a method and/or apparatus for distributing user data and error correction data over different page types by leveraging error rate variations that may (i) distribute user data and error correction data, which forms a super codeword, across multiple page types to make the failure rates of sub-pages more independent, (ii) achieve the same read throughput as conventional RAID-like techniques, (iii) provide user data write throughput that is the same as conventional RAID-like techniques, (iv) delay the parity data writing latency if multiple rows (e.g., 2 or 4) do not arrive at the same time, (v) provide user data programming that is faster than conventional RAID-like techniques, (vi) mitigate lower page corruption, and/or (vii) be implemented as one or more integrated circuits.

In various embodiment, pages within a flash memory block are classified into a number of different types, which have different page error rates. In various embodiments, the classification is based on physical location (e.g., even/odd pages or borderline pages) on a wordline and logical bit location (e.g., LSB/MSB pages) inside a flash cell. S-pages, which form a super codeword, are distributed across multiple page types (e.g., different relative physical location and logical bit location) to provide an error rate for sub-S-pages that is more independent. In future 3-bit per cell flash memory, embodiments of the invention may have more freedom in deciding the super-page mapping selections. In various embodiments, a possibility of data corruption caused by page failure is decreased when compared with conventional RAID-like techniques, while still keeping similar reading and similar writing speeds.

Figure 1:
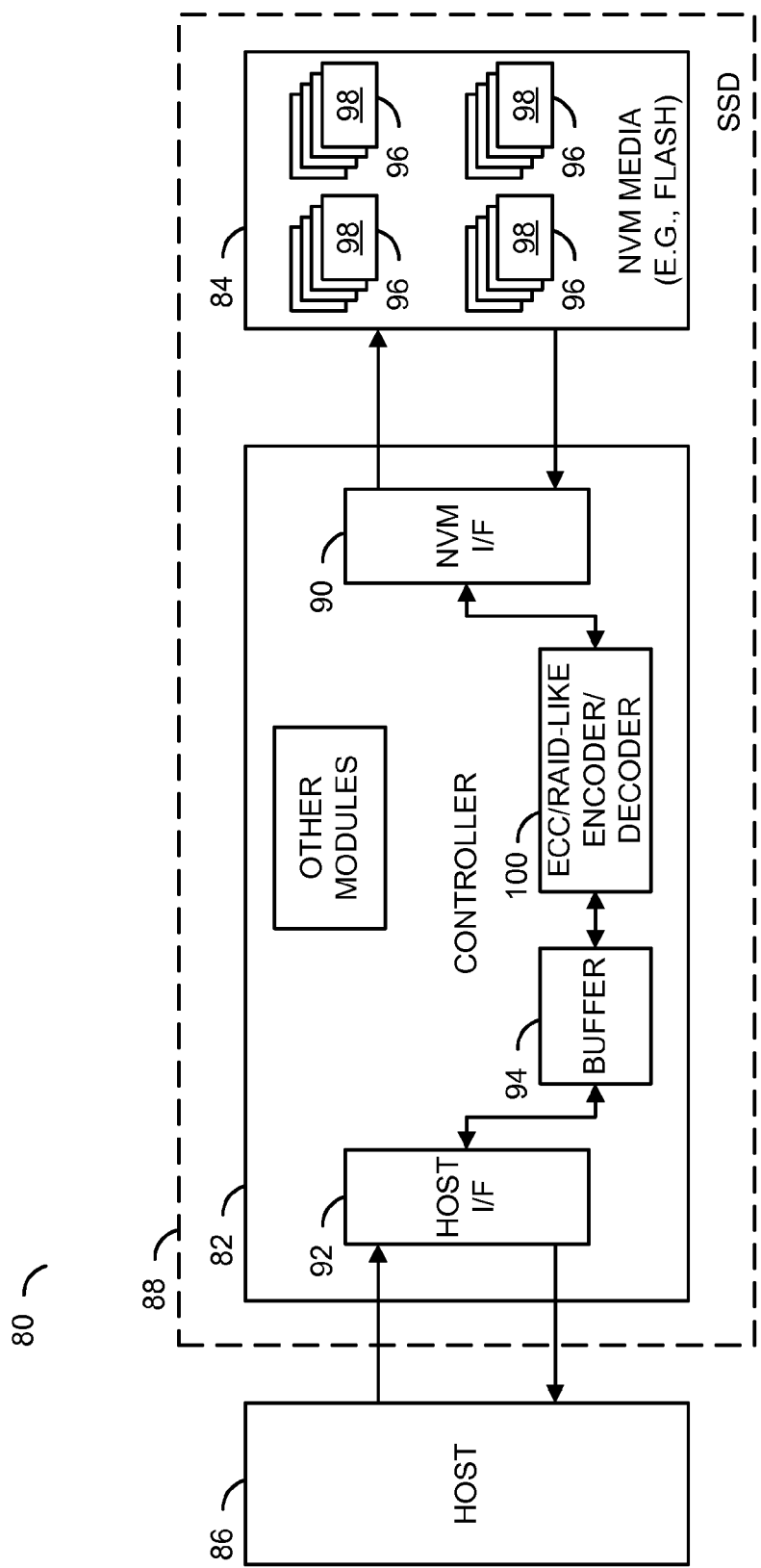
FIG. 1 is a diagram illustrating a solid state drive (SSD)/non-volatile memory controller in accordance with an embodiment of the invention.

Referring to FIG. 1, a diagram is shown illustrating a non-volatile memory system 80 in accordance with an embodiment of the invention. In various embodiments, the non-volatile memory system 80 comprises a block 82, a block 84, and a block 86. The block 82 comprises a memory controller implementing a data distribution technique in accordance with an embodiment of the invention. The block 84 comprises a non-volatile memory (NVM) media. The block 86 comprises a host.

The controller 82 may be configured to control one or more individual non-volatile memory lanes. In some embodiments, the controller 82 may implement multiple memory lane controller instances to control a plurality of non-volatile memory lanes. The controller 82 has a non-volatile memory interface 90 configured to couple the controller 82 to the non-volatile memory media 84. The non-volatile memory media 84 may comprise one or more non-volatile memory devices 96. The non-volatile memory devices 96 have, in some embodiments, one or more non-volatile memory die 98. According to a type of a particular one of the non-volatile memory devices 96, a plurality of non-volatile memory die 98 in the particular non-volatile memory device 96 are optionally and/or selectively accessible in parallel. The non-volatile memory devices 96 are generally representative of one type of storage device enabled to communicatively couple to controller 82. However, in various embodiments, any type of storage device is usable, such as SLC (single level cell) NAND flash memory, MLC (multi-level cell) NAND flash memory, TLC (triple level cell) NAND flash memory, NOR flash memory, read-only memory (ROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), resistive random-access memory (RRAM or ReRAM), or any other type of memory device or storage medium.

In some embodiments, the controller 82 and the non-volatile memory media 84 are implemented on separate integrated circuits. When the controller 82 and the non-volatile memory media 84 are implemented as separate integrated circuits (or devices), the non-volatile memory interface of the controller 82 is generally enabled to manage a plurality of data input/output (I/O) pins and a plurality of control I/O pins. The data I/O pins and the control I/O pins may be configured to connect the device containing the controller 82 to the external device(s) forming the non-volatile memory media 84. In various embodiments, the controller 82 is implemented as an embedded controller. In various embodiments, the controller 82 and the NVM media 84 implement a solid-state drive or disk (SSD) 88.

The controller 82 also has a command interface 92 configured to receive commands and send responses to the host 86. In embodiments implementing a plurality of non-volatile memory lanes, the controller 82 also includes multiplexing circuitry coupling the multiple instances of memory lane controllers to a back-end processing unit (BEPU) providing scheduling and/or data management of the plurality of non-volatile memory devices 96. In various embodiments, the BEPU comprises data buffering and direct memory access (DMA) engines to store data or other information and to move the data or other information between the host 86 and the NVM media 84 using one or more memory lane controllers within the controller 82.

When a non-volatile memory read operation is performed (e.g., in response to a request originating either externally from the host or internally from the controller) raw data is retrieved from the NVM media 84. To ensure the data returned is correct, various ECC codes can be used, such as BCH (Bose Chaudhuri Hocquenghem) codes, LDPC (low-density parity-check) code, turbo codes, polar codes, and convolutional codes. The ECC decoding may operate on the granularity of a codeword (of fixed or variable size), referred to as an e-page. Under normal conditions, the ECC decoding can correct errors in the raw e-page using on-the-fly (or dynamic) decoding and return the corrected e-page (and/or other requested data, such as statistics) immediately (e.g., via a buffer 94). In such cases, the read operation for the particular e-page is considered complete. The controller 82 can perform various retry tasks when on-the-fly read decoding fails.

In various embodiments, the controller 82 includes a circuit 100 that implements error correction code (ECC) and/or RAID (redundant array of independent drives)-like encoding and decoding functionality. In various embodiments, the circuit 100 provides higher-level redundancy functions using a redundancy code, such as a RAID-like code, etc., across a number of die 98 in a NVM device 96. In various embodiments, the circuit 100 performs encoding and decoding operations that implement higher-level redundancy functions using a redundancy code such as a RAID-like code. For example, during decoding operations the circuit 100 uses the redundancy code to correct one or more e-pages from a group of e-pages that were encoded using a corresponding encoding operation. In various embodiments, the circuit 100 is further configured to distribute user data and error correction data over different page types in the NVM media 84 by leveraging error rate variations.

Figure 2:
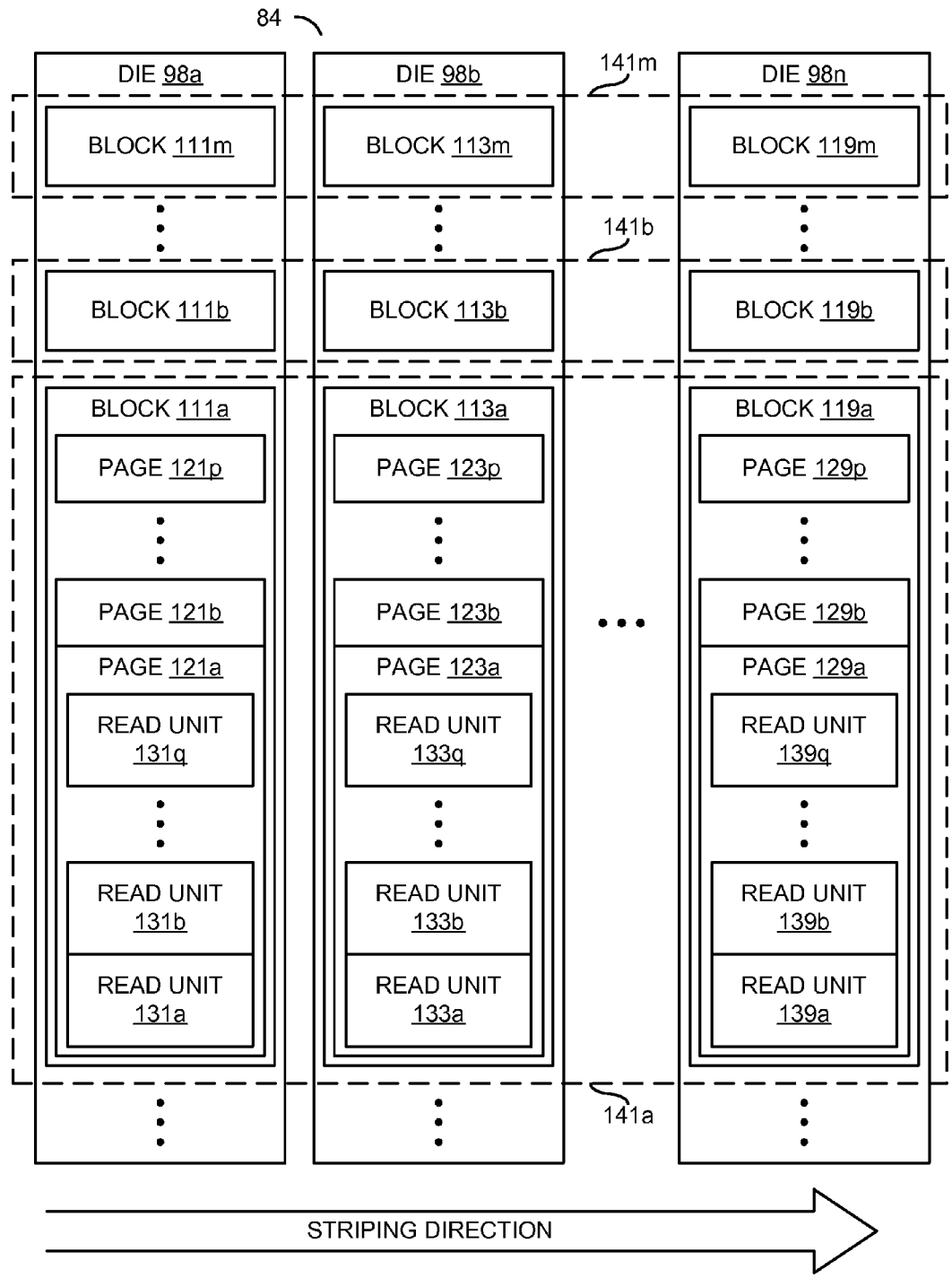
FIG. 2 is a diagram illustrating selected details of an embodiment of die, super-blocks, blocks, super-pages, pages, and e-pages of multiple non-volatile memory devices.

Referring to FIG. 2, a diagram of an example implementation of the NVM media 84 of FIG. 1 is shown illustrating selected details of an embodiment of die, super-blocks, blocks, super-pages, pages, and e-pages of multiple non-volatile memory devices. In one example, the NVM media 84 may comprise multiple non-volatile memory devices embodying a number of blocks, pages, and read units (or e-pages). For example, devices 98a-98n correspond to respective ones of one or more individual non-volatile memory dies. In some embodiments, NVM devices 98a-98n are a portion of the NVM media 84. For example, in various embodiments, data is striped independently across multiple groups of devices, where each of the groups of devices is independently accessible.

Each NVM device (e.g., any one of the devices 98a, 98b, . . . , and 98n) provides storage organized as a plurality of NVM blocks (e.g., blocks 111a, 111b, . . . , and 111m of device 98a; blocks 113a, 113b, . . . , and 113m of device 98b; and so forth). The NVM blocks in turn include a plurality of NVM pages (e.g., pages 121a, 121b, . . . , and 121p of block 111a; pages 123a, 123b, . . . , and 123p of block 113a; and so forth). The NVM pages in turn comprise a plurality of read units (e.g., read units 131a, 131b, . . . , and 131q of page 121a; read units 133a, 133b, . . . , and 133q of page 123a; and so forth). Reads and/or writes of information in the devices are performed according to an order, such as a 'read unit first' order or a 'page first' order. An example of a read unit first order for read units illustrated in FIG. 2 begins with read unit 131a followed by units 133a, . . . , 139a, 131b, 133b, . . . , 139b, and so forth, ending with unit 139q. An example of a page first order for read units illustrated in FIG. 2 begins with read unit 131a followed by units 131b, . . . , 131q, 133a, 133b, . . . , 133q, 139a, 139b, and so forth, ending with unit 139q.

In various embodiments, the NVM blocks of the NVM media 84 are organized as a plurality of super-blocks (e.g., super-blocks 141a, 141b, . . . , 141m). The super-blocks are used as a unit of allocation. The super-blocks comprise n blocks from each die (n being most typically 1 or 2 with, for example, current flash devices). In some embodiments, there are b super-blocks (0 to b−1), and super-block k comprises the k'th block from each die. In other embodiments, there are b/2 super-blocks, and super-block k comprises the k'th block and the k+b/2'th block from each die.

In various embodiments, the non-volatile memory dies 98a-98n comprise a number of planes (e.g., one, two, four etc.). Each plane comprises a number (e.g., 512, 1024, 2048, etc.) of NVM blocks. Each of the NVM blocks comprises a number of pages, such as 128, 256, or 512 pages. A page is generally the minimum-sized unit that can be independently written, and a block is generally the minimum-sized unit that can be independently erased. In various embodiments, each page of the non-volatile memory devices 98a-98n comprises a plurality of read units, which may also be referred to as ECC-pages or simply e-pages. Each e-page is an amount of user data and the corresponding ECC data that, together, comprise one ECC codeword (e.g., a correctable unit). Typically, there are an integer number of e-pages per NVM page, or in some embodiments, per multi-plane page. The e-pages are the basic unit that can be read and corrected, hence e-pages are also called "read units." Typically, read units may have 1 KB or 2 KB of user data, and an even share of the remaining bytes in the non-volatile memory page (so that all read units in a same one of the multi-plane pages are the same total size). An e-page (or read unit) is thus the minimum-sized unit that can be independently read (and ECC corrected).

Some non-volatile memory die, such as flash die, generally enable multi-plane operations—operating on one or more of the planes in parallel—which improves bandwidths. For this reason, the term NVM block as used herein generally refers to a multi-plane block, such as one block from each of the planes, and the term page as used herein generally refers to a multi-plane page, such as one page from each of the planes. In various embodiments, super-blocks may comprise one or more multi-plane blocks from each die. The super-blocks in turn comprise a plurality of super-pages. A super-page comprises 1 (multi-plane) page from each of the (multi-plane) blocks in the super-block. In various embodiments, the pages making up a super-page comprise a plurality of page types. The page types are classified based on error rate variations.

In various embodiments, the pages inside a flash block are classified into a number of page types, which have significant error rate variations. The classification is based on physical transistor location (even or odd cells) on a wordline and logical bit location (LSB or MSB) inside a flash cell. In various embodiments, a super-page contains data stored in pages on different relative physical location and logical bit location, thus the sub-super-pages error rate can be more independent and the error correction performance of a RAID-like technique can be significantly improved. The possibility that multiple sub-super-pages in multiple dies fail at the same time can be largely mitigated. The reading throughput is the same as conventional RAID-like techniques. The user data writing throughput and latency is also the same as conventional RAID-like as this policy writes a row of data to flash memory arrays once the row of data is ready (same as conventional techniques). If multiple rows of data come at the same time, the parity dies writing throughput is the same as conventional RAID-like techniques. If multiple rows of data do not come at the same time, the parity dies data can be completed once all necessary rows have arrived (e.g., 2 for an MLC all-bit-line architecture flash and 4 for an MLC even-odd architecture flash). Each time a user data row is written into the flash memory arrays, all the parity data for all rows are partially calculated and there is no need to buffer the data once each row is ready (same as conventional RAID-like techniques). Once the last row (2 or 4) arrives, the parity data for all rows are ready and can be written into the flash memory dies.

Embodiments of the invention can be used to solve the reliability problem of conventional RAID-like techniques that the different sub-pages of a super-page may fail at the same time as the pages in the current super-page may suffer from the same program interference and the same circuit level noise as they share the same architecture although they are on different dies. In various embodiments, the super-pages, which form a super codeword, are distributed across multiple page types to make the failure rates of sub-super-pages more independent. In a first programming method, the parity data writing latency may be delayed for some time if multiple rows (e.g., 2 or 4) do not arrive at the same time. When multiple rows of data arrive at the same time, even parity data write latency is eliminated. In a second programming method, the data program speed is the same as conventional RAID-like techniques.

In conventional RAID-like techniques, the same block number across multiple dies form one super-block. The same page number inside one super-block form one super-page. up to m physical flash pages in a super-page store user data, (n−m) physical flash pages in a super-page are parity data. Parity data are calculated from the user data to protect the user data. Potential shortcomings of the conventional RAID-like techniques include: the super-page in the RAID-like structure is a super codeword and each physical flash page in a super-page is a super-symbol of the codeword; the conventional super-page leverages the error rate variation among different dies to protect the data in some weakest die in case a whole physical page fails (e.g., uncorrectable physical page). However, the error rate inside a block has some correlation with the page number. Pages of the same number in different blocks tend to have the same program interference and the same layout architecture. A border page in a block tends to have a higher error rate.

In various embodiments, pages of different number inside different block/dies are used to form one super codeword (super-page) to leverage the error rate difference between the page types. At the same time, the read throughput is kept exactly the same as the conventional RAID-like techniques. In a first programming method in accordance with an embodiment of the invention, the user data write throughput is the same as conventional RAID-like techniques. In a second programming method in accordance with an embodiment of the invention, the user data write throughput is even higher than the conventional RAID-like techniques, and the total write throughput is the same as conventional RAID-like techniques.

Figure 3:
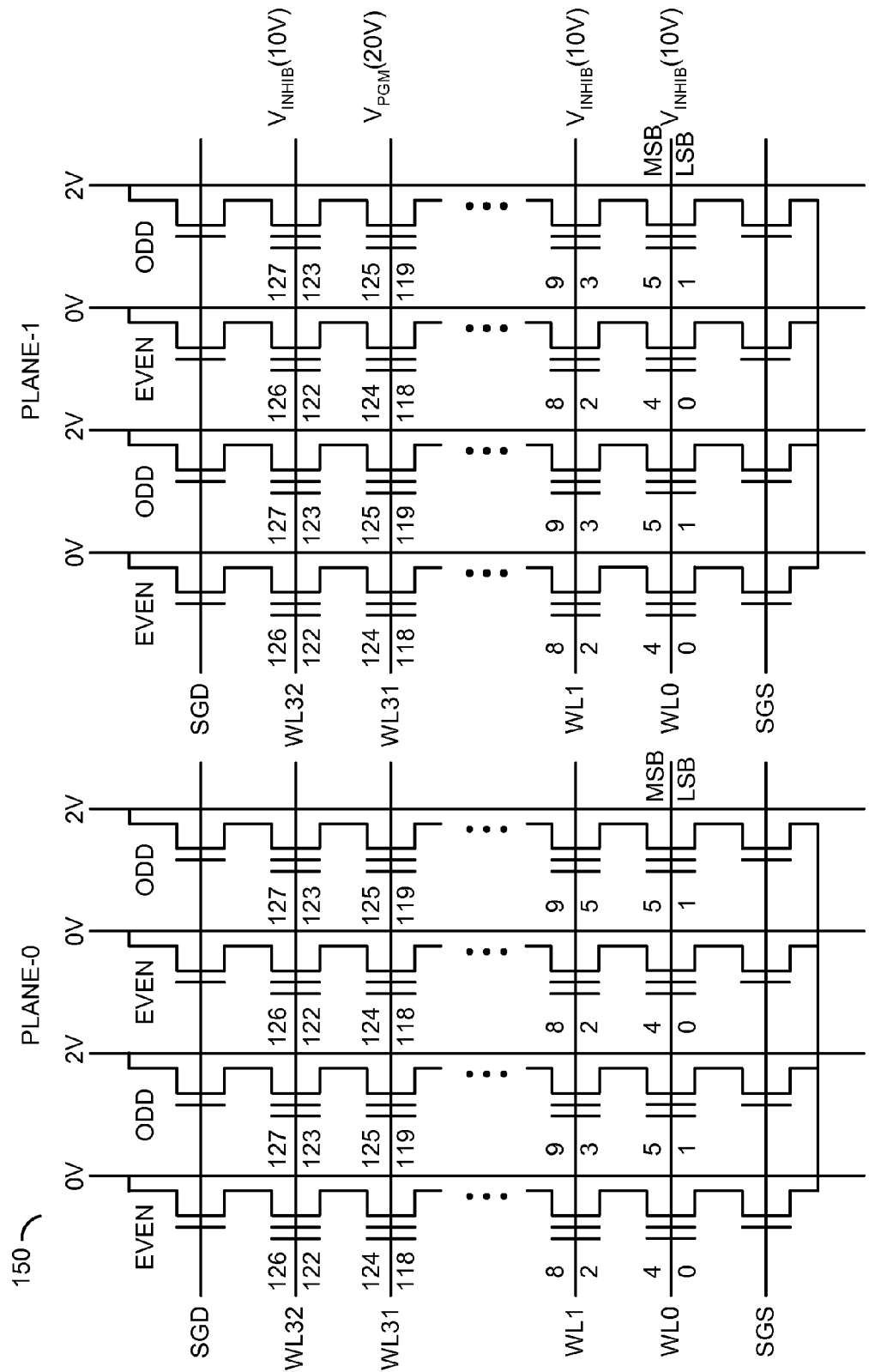
FIG. 3 is a diagram illustrating a memory with an even-odd architecture.

Referring to FIG. 3, a diagram of a memory array 150 is shown illustrating an example of a memory implemented with an even-odd architecture. Page classifications are generally made according to error rates (e.g., shown as numbers above and below wordlines WL0-WL32). For example, in some embodiments pages in the even-odd architecture may be classified with page types of even-upper, even-lower, odd-upper, and odd-lower.

Figure 4:
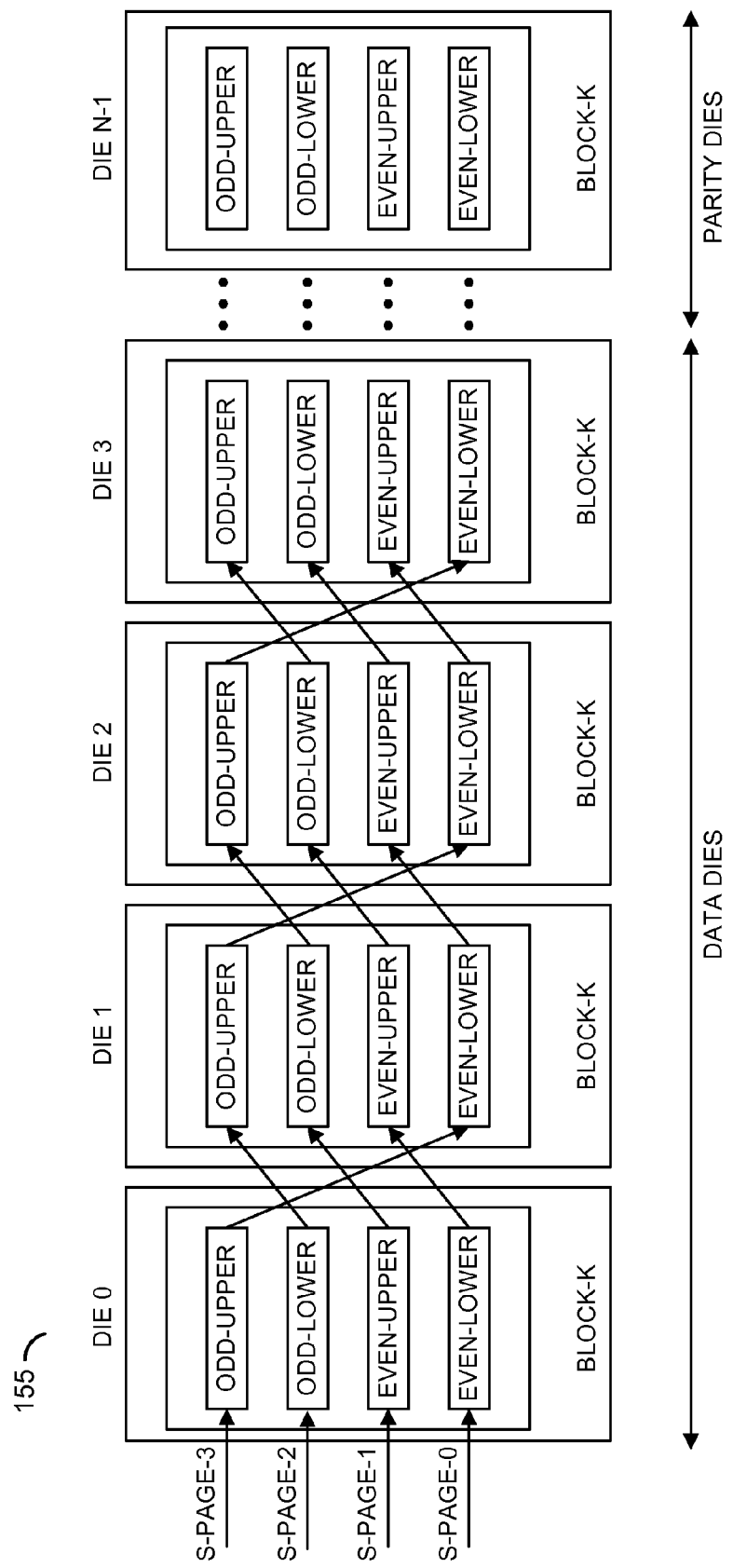
FIG. 4 is a diagram illustrating an example super-page organization using the even-odd memory architecture of FIG. 3.

Referring to FIG. 4, a diagram of a memory array 155 is shown illustrating an example super-page organization in accordance with an embodiment of the invention. In various embodiments, super-pages may be implemented in an even-odd architecture memory comprising all four of the following page types: Even-Upper (MSB), Even-Lower (LSB), Odd-Upper (MSB), and Odd-Lower (LSB).

Figure 5:
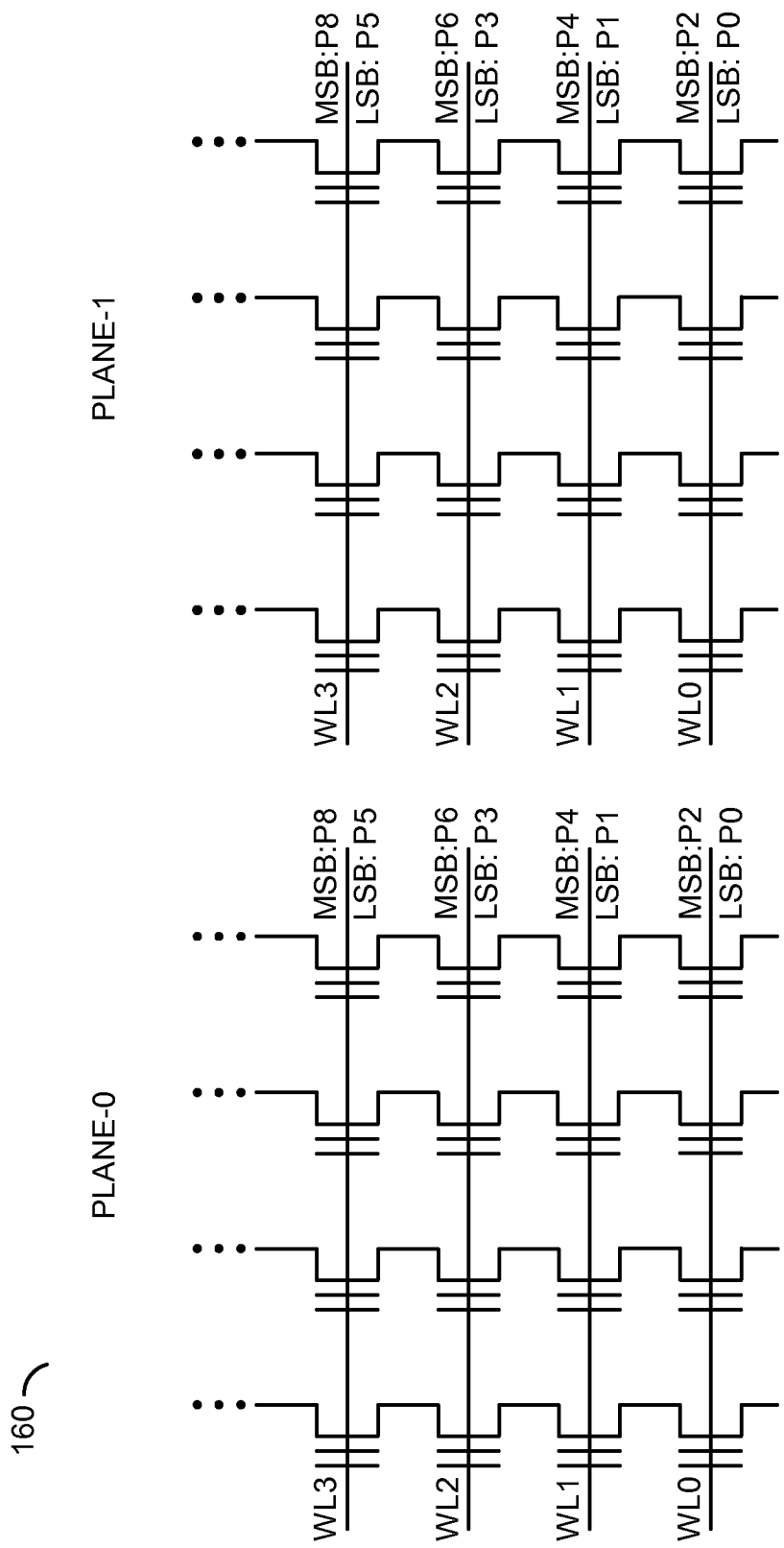
FIG. 5 is a diagram illustrating a memory with an all-bit-line memory architecture.

Referring to FIG. 5, a diagram of a multi-plane memory 160 is shown illustrating an example of a MLC all-bit-line architecture. In embodiments implementing the all-bit-line architecture memory, the pages are generally classified as least significant bit (LSB) pages (e.g., P0, P1, . . . , P5, etc.) and most significant bit (MSB) pages (e.g., P2, P4, . . . , P8, etc.).

Figure 6A:
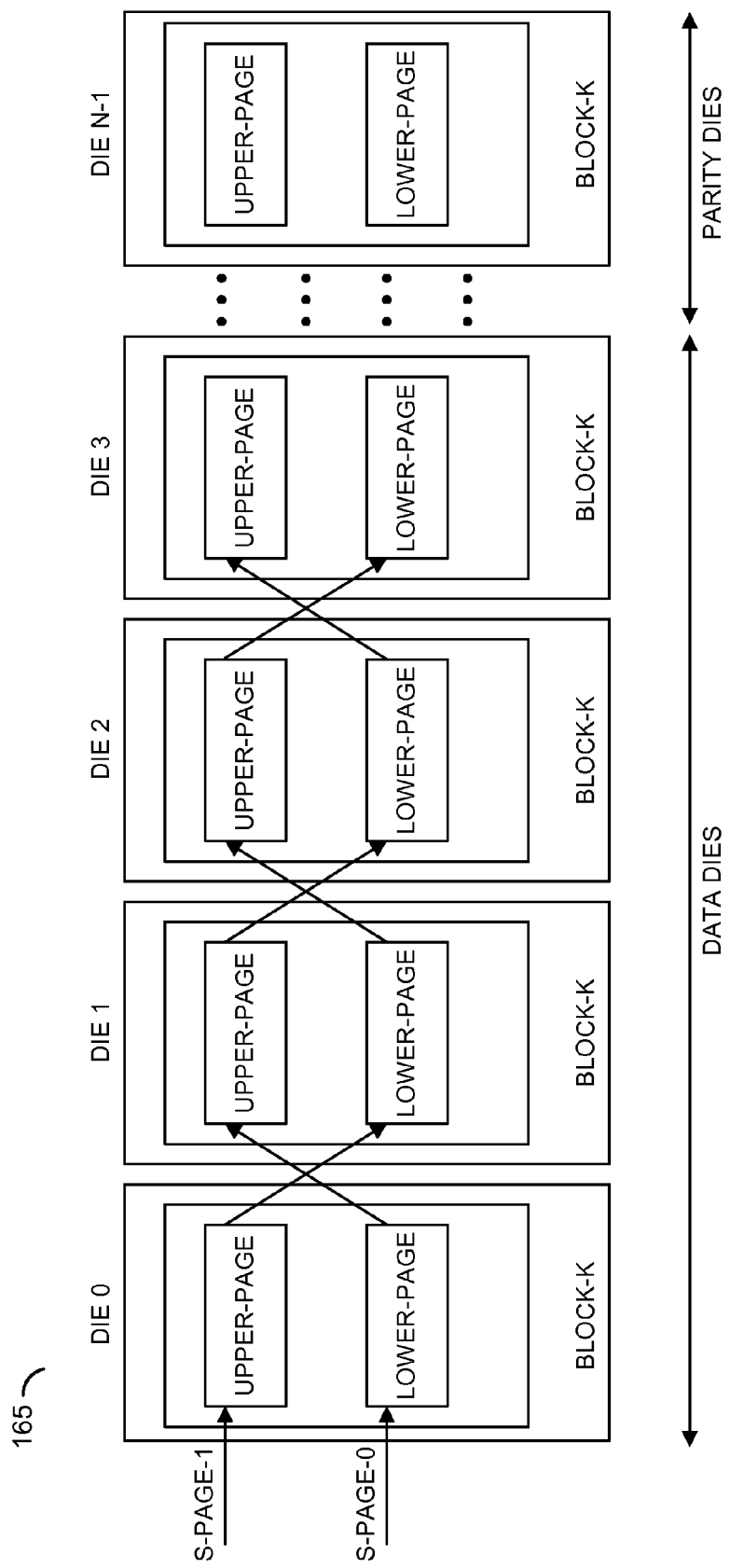
FIGS. 6A-6C are diagrams illustrating a variety of example super-page organizations using a memory architecture with two page types.
Figure 6B:
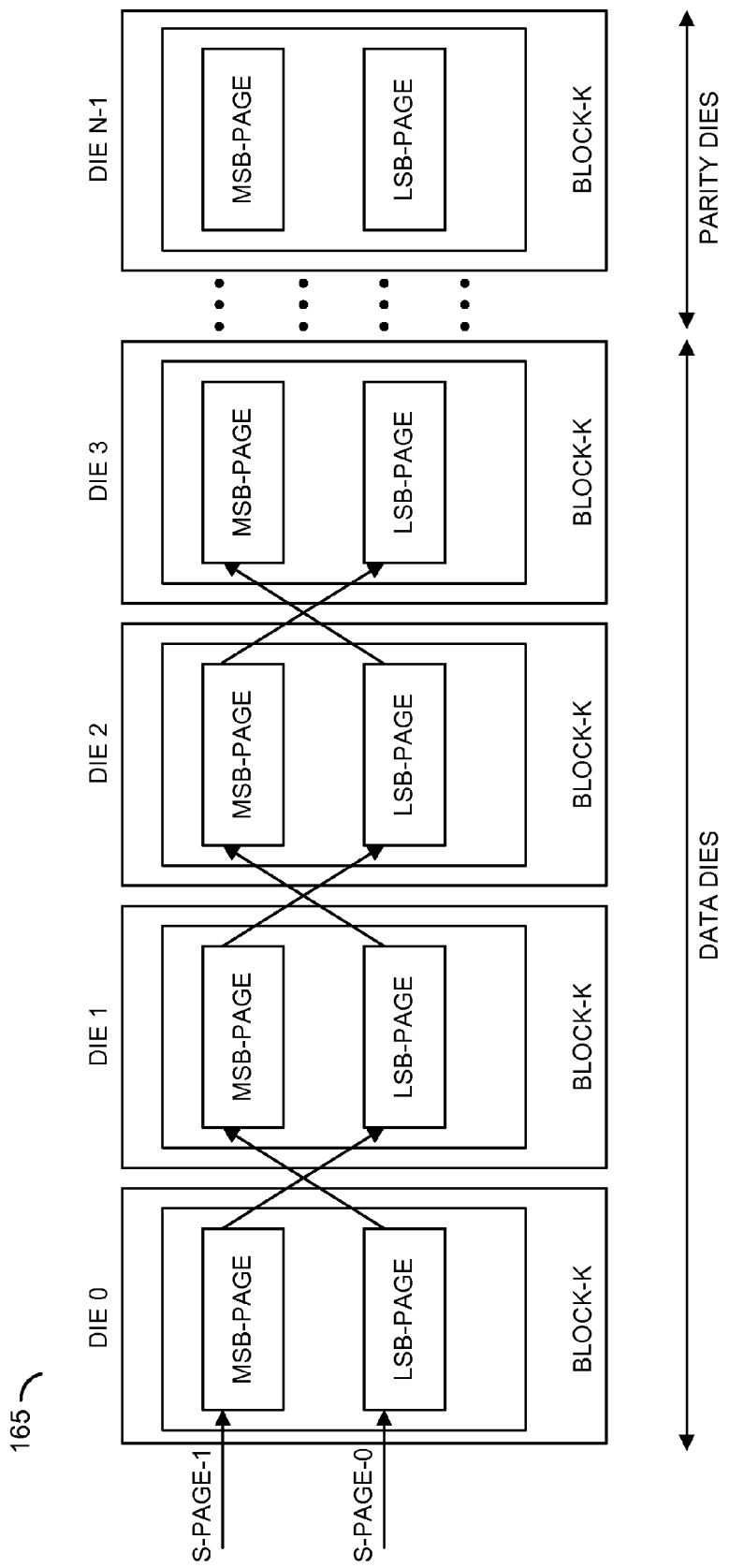
Figure 6C:
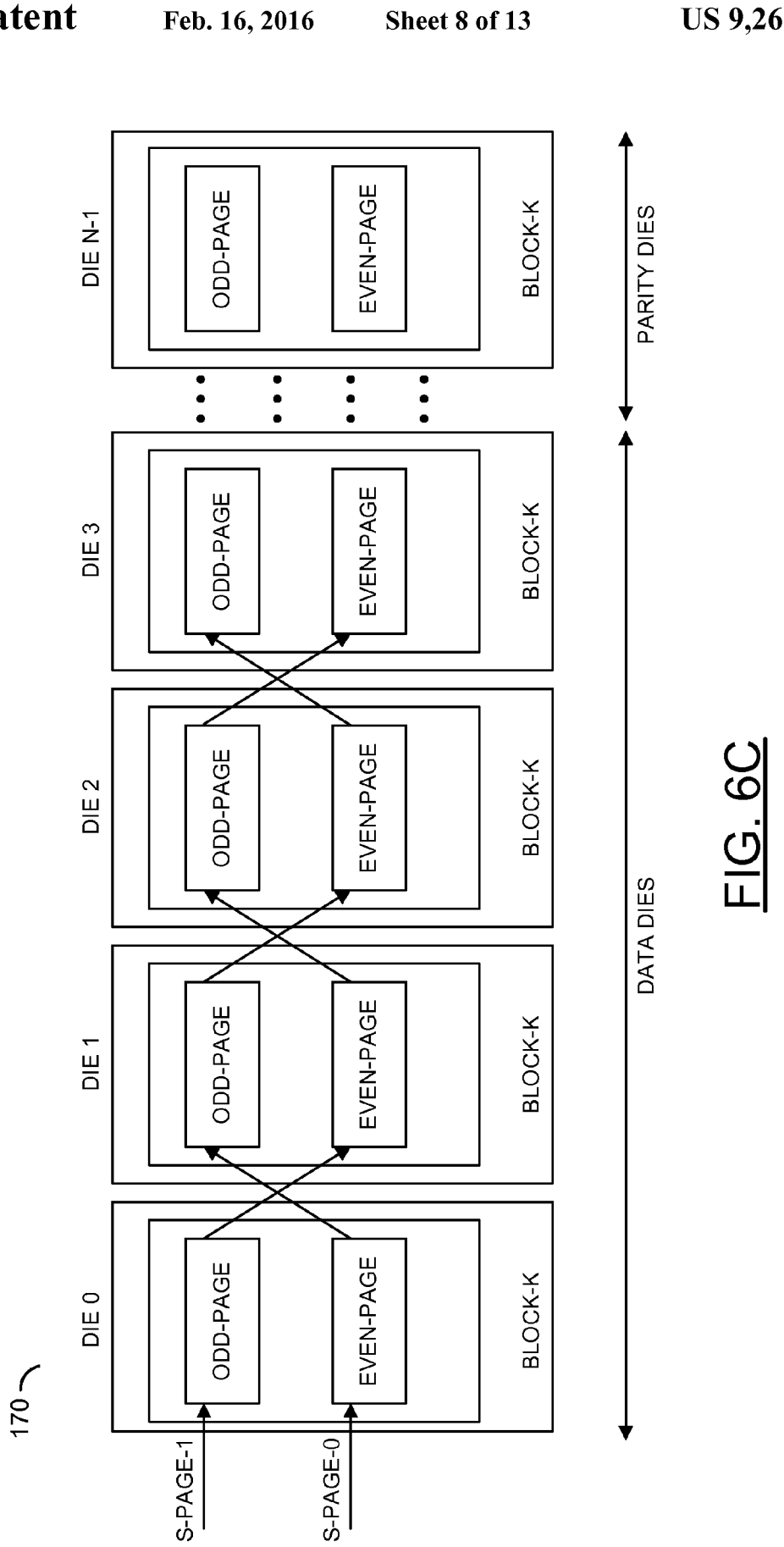

Referring to FIGS. 6A-6C, diagrams are shown illustrating a variety of example super-page organizations in accordance with an embodiment of the invention. As shown in FIGS. 6A and 6B, super-pages may be implemented in an MLC all-bit-line architecture memory 165 comprising two page types: MSB pages and LSB pages, or upper pages and lower pages. As shown in FIG. 6C, super-pages may also be implemented with two page types, even pages and odd pages, in SLC flash memory 170 with even-odd cell architecture.

In various embodiments, a read operation is performed similarly to a conventional RAID-like application. A physical page is read, and if the read succeeds, the process moves on. If the physical page read fails, the whole super-page is read from different die and the same process used in the conventional RAID-like method is employed to recover the failed page. Programming methods implemented in accordance with embodiments of the invention (discussed later) guarantee that the user data pages and parity pages of a super-page are distributed across different dies. So one super-page can be read out of multiple dies in parallel.

In conventional systems, a write operation is performed by the host writing a batch of user data to the flash controller, the flash controller patching the user data in multiples of rows with each row containing m flash physical pages, the flash controller generating parity data (n−m) physical pages from each row as parity data, and the flash controller writing the data row by row of each super-page into the flash memory. The conventional method needs a large amount of buffer space. In various embodiments, a new method for generating the parity data is provided. In an example using a flash memory having L types of pages (e.g., L=2 for an MLC all-bit-line architecture flash, L=4 for an MLC even-odd architecture flash, etc.), each row of data goes to only one of the super-pages. For example, in all-bit-line architecture memory embodiments, a first row goes to LSB pages and a second row goes to MSB page. In even-odd architecture memory embodiments, the first row goes to LSB-even pages, the second row goes to LSB-odd pages, a third row goes to MSB-even pages, and a fourth row goes to MSB-odd pages. The parity data is calculated in parts (or steps) using the following Equation 1:

$$P = \sum_{i=1}^{m} U_i \times P_i = \sum_{i=1}^{L-1} \sum_{K=1}^{m/L} U_{(KL+i)} \times P_{(KL+i)}$$

The parity check can be completed in L steps (portions), which can be performed either sequentially or in parallel, as illustrated by the following Equation 2:

$$\begin{aligned} P = (U_1 \times P_1 + U_{(L+1)} \times P_{(L+1)} + \ldots + U_{(m-L+1)} \times P_{(m-L+1)}) + & \quad \text{Part 1} \\ (U_2 \times P_2 + U_{(L+2)} \times P_{(L+2)} + \ldots + U_{(m-L+2)} \times P_{(m-L+2)}) + & \quad \text{Part 2} \\ \ldots + & \quad \ldots \\ (U_L \times P_L + U_{(L+L)} \times P_{(L+L)} + \ldots + U_{(m-L+L)} \times P_{(m-L+L)}) & \quad \text{Part L} \end{aligned}$$

In various embodiments, each parity data row is calculated from up to L user data rows. Each user data row contributes a different 1/L fraction of the data for each parity row calculation. For example, parity data row-0 protects every 1, L+1, 2L+1, etc. physical page of the 1st user data row, every 2, L+2, 2L+2, etc. physical page of the 2nd user data row, . . . , and every L, L+L, 2L+L, . . . of the L-th user data row. In various embodiments, each super-page contains data from all L different user data rows, thus the error rates of physical pages are more independent.

In various embodiments, parity data is computed in parallel. When a user data row arrives, the user data row is divided into L separate parts. Each part is assigned to one of the L parity data row calculation. Each parity row calculation can complete one of the L parity calculation steps. A similar process occurs when the 2nd user data row arrives, the 3rd user data row arrives, etc. When the L-th user data row arrives, all of the L parity row calculations finish the last step of the L step calculation and are ready to be programmed into flash memory. It is advantageous, in some embodiments, for the die storing the parity to be different for each of the L portions, enabling the parity to be programmed in parallel rather than being serialized on a single die. For example, die n−L+1 is used to store the first parity row calculation result, die n−L+2 is used to store the second parity row calculation result, . . . , and die n is used to store the Lth parity row calculation result. Locations not used for parity in a given row are used for data.

The following provides an illustrative example. When a user data row arrives, a first one 1/L portion of the data of the user data row is used to calculate Part 1 for parity row-0, a second one 1/L portion of the user data row is used to calculate Part 2 for parity row-1, and so on. When the second data row arrives, a first one 1/L portion of the second data row is used to calculate in Part-L for parity row-0, a second one 1/L portion of the second data row is used to calculate in Part-1 for parity row-1, a third one 1/L of the second data row is used to calculate Part 2 for row-2, and so on. Thus, each time a user data row arrives, 1/L calculations have been finished for all related parity rows. When all L user data rows have arrived, the parity data will be completed.

Figure 7:
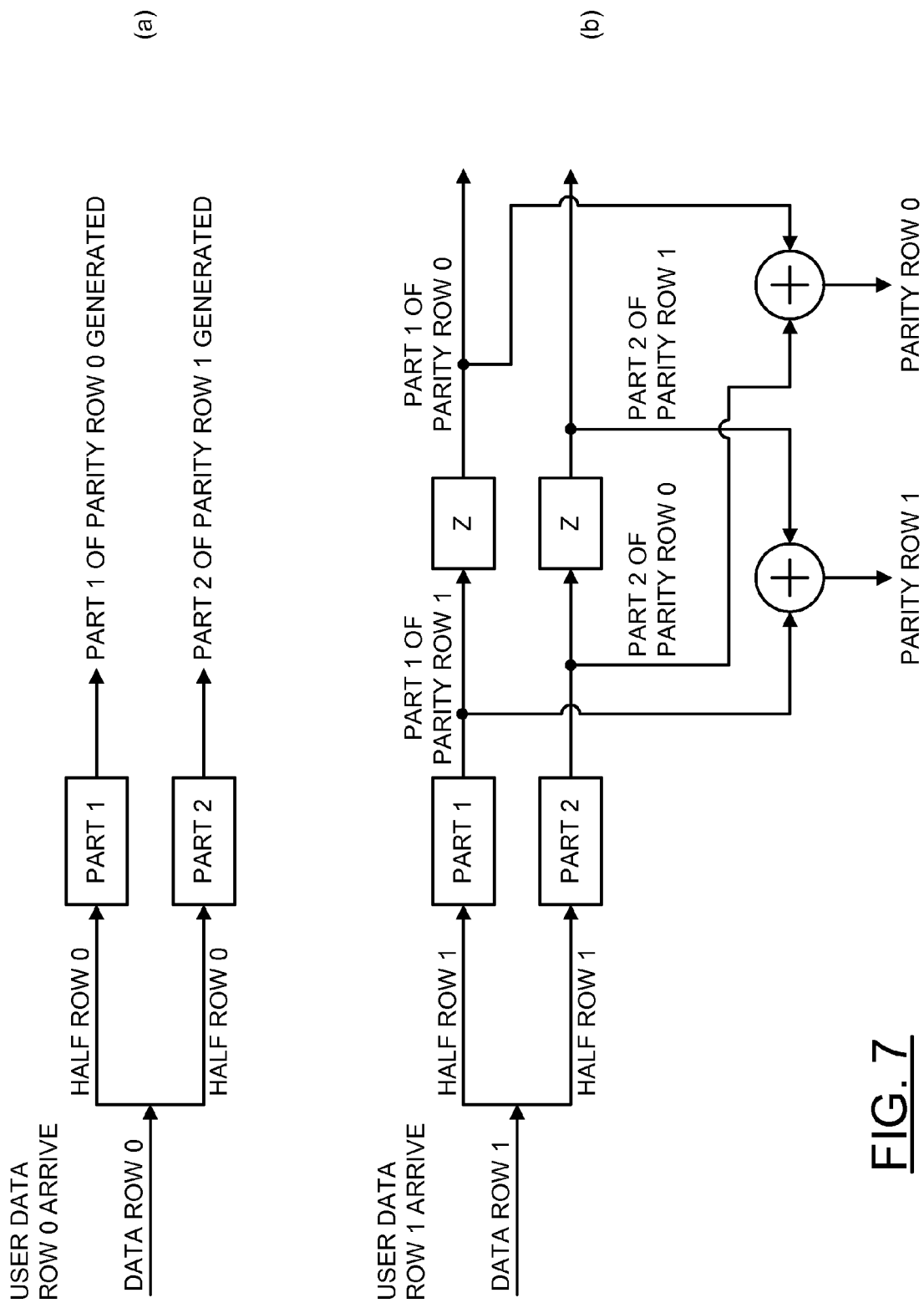
FIG. 7, is a diagram illustrating an example parity generating process in accordance with an embodiment of the invention.

Referring to FIG. 7, a diagram is shown illustrating an example parity generating process in accordance with an embodiment of the invention. The example parity generating process is illustrated using an MLC all-bit-line architecture memory (e.g., L=2 types of pages). Referring to section (a) of FIG. 7, when a first user data row (e.g., data row 0) arrives, Part 1 of parity-row 0 and part 2 of parity-row 1 are generated. Referring to section (b) of FIG. 7, when a second user data row (e.g., data row 1) arrives, Part 1 of parity-row 1 and part 2 of parity-row 0 are generated. Once the second user data row arrives all of the two parity row data are fully generated. Similarly, when a 4th user data row arrives, all four parity row data are fully generated. The blocks marked "Z" represent the time delay (latency) between the two calculation steps.

Figure 8:
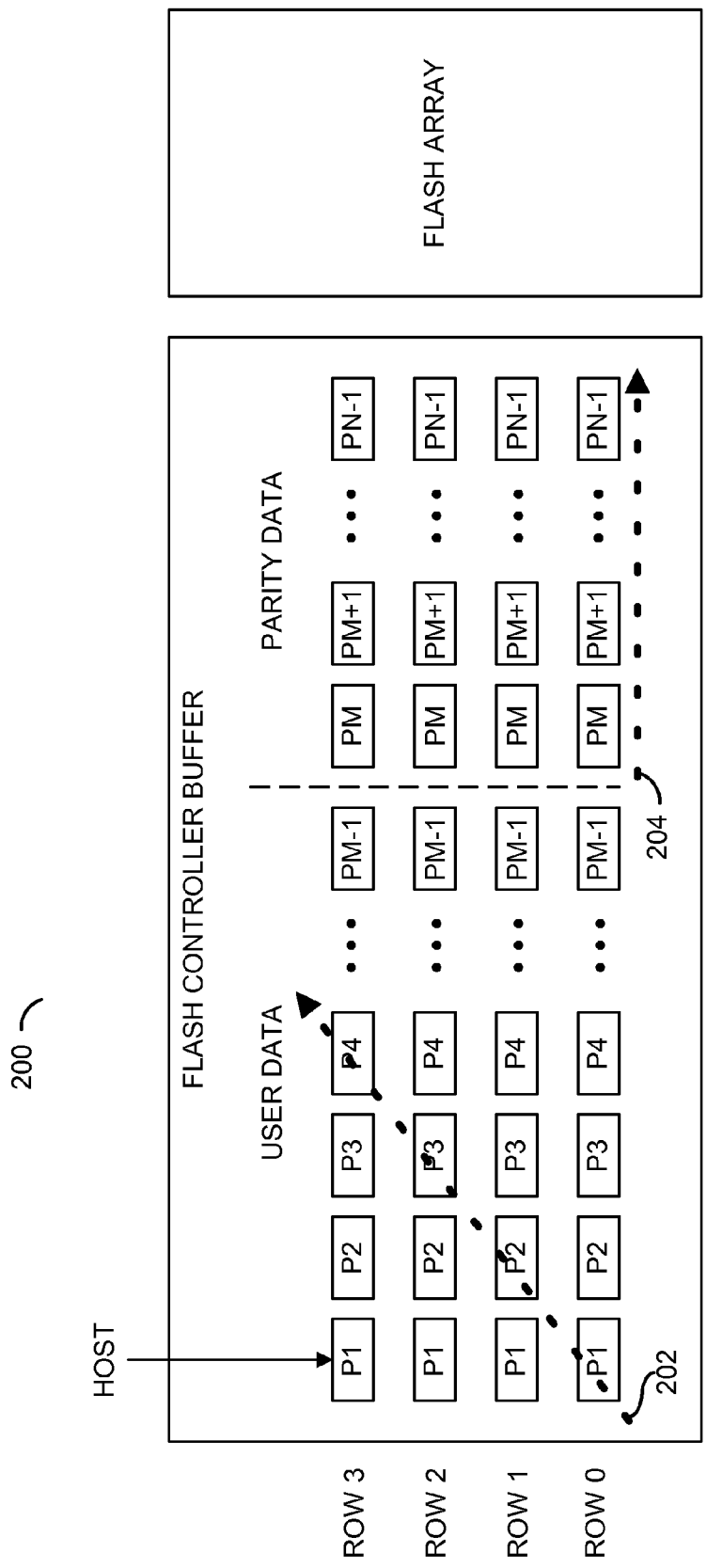
FIG. 8 is a diagram illustrating an example write operation in accordance with an embodiment of the invention.

Referring to FIG. 8, a diagram of a process 200 is shown illustrating contents of a flash controller buffer during an example flash memory writing process implemented in accordance with an example embodiment of the invention. In various embodiments, a write operation comprises the following steps:

Step 1: a host writes a batch of user data to the flash controller.

Step 2: the flash controller arranges the user data into multiple rows, where each row contains m flash physical pages.

Step 3: the flash controller calculates the parity data (n−m) physical pages of all the parity row. One of L steps of parity calculation is finished. At the same time, the user data row is programmed into the flash memory immediately without any delay. Assumes that the flash has L types of pages (e.g., 2 for an MLC all-bit-line architecture, 4 for an MLC even-odd-bit line architecture, etc.). An arrow 202 indicates a selection 0 used to generate parity data indicated by an arrow 204.

Figure 9:
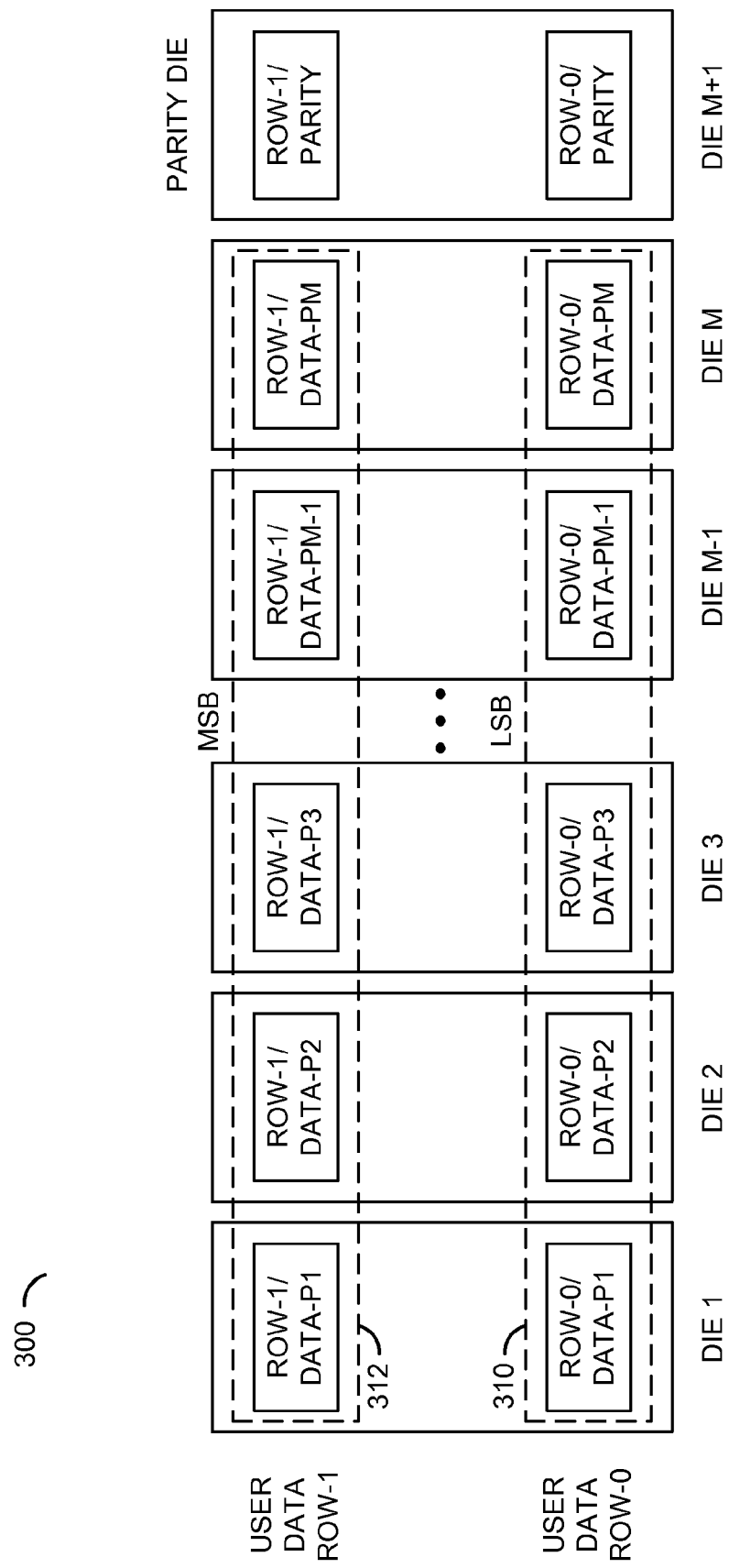
FIG. 9 is a diagram illustrating an example programming method in accordance with an embodiment of the invention.

Referring to FIG. 9, a diagram of a memory array 300 is shown illustrating an example process for programming a flash memory with an LSB-MSB architecture in accordance with an example embodiment of the invention. The flash memory programming process (or method) illustrated in FIG. 9 includes a parity page delay, but has a user data layout similar to conventional RAID-like schemes. In a first step, user data Row-0 is written into a super-page 310 comprising the LSB pages of the user data dies 1, . . . , M; the Row-0 parity and Row-1 parity calculation are 50% completed (as shown in section (a) of FIG. 7). In a second step, user data Row-1 is written into a super-page 312 comprising the MSB pages of the user data dies 1, . . . , M, the Row-0 parity and Row-1 parity calculation are completely finished 100% (as shown in section (b) of FIG. 7), and the Row-0 parity is written into the LSB page of the parity die M+1. In a third step, user data Row-3 is written into another LSB page of the user data die (not shown), Row-1 parity is written into a MSB page of the parity die M+1, and Row-2 and Row-3 parity data calculations are 50% finished. Because Row-1 parity and Row-0 parity contend for the parity die M+1, Row-0 parity can not be written at the same time when programming Row-1 data. Row-1 parity data can be programmed later (e.g., 1 page program delay for all-bit-line architecture memory and 3 pages program delay for even-odd architecture memory).

Figure 10:
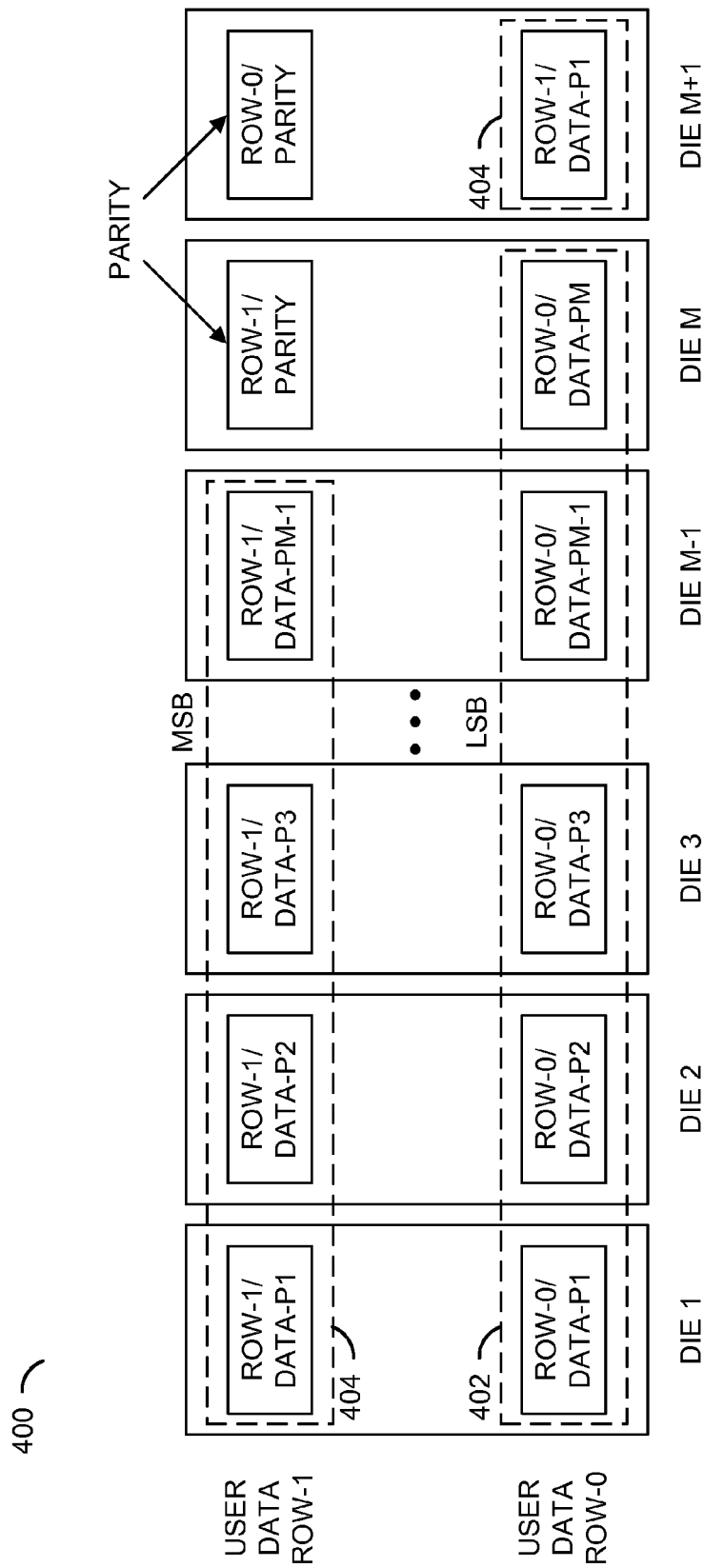
FIG. 10 is a diagram illustrating another example programming method in accordance with an embodiment of the invention.

Referring to FIG. 10, a diagram of a memory array 400 is shown illustrating an example process for programming a flash memory in accordance with another example embodiment of the invention. The process (or method) illustrated in FIG. 10 generally incurs no delay. A first step comprises LSB page programming while a second step comprises MSB page programming. In the LSB page programming step, user data Row-0 is programmed into a super-page 402 of the flash memory 400, part of a super-page 404 containing Row-1 user data is programmed into the flash memory 400 simultaneously with the Row-0 user data (e.g. Row-1/Data-P1), and Row-0 parity data and Row-1 parity data calculations are 50% finished. In the MSB page programming step, Row-0 parity and Row-1 parity data calculations are 100% finished, the parity data is programmed into the flash memory 400, and the remaining portion of the super-page 404 containing the user data Row-1 is written into the flash memory 400. Once the second user data row arrives, calculations for two parity rows are finished and the two parity rows can be programmed into the flash dies at the same time (e.g., no delay). There is no delay for total data programming. The user data programming could be even faster (e.g., part of user data Row-1 can be programmed in step 1). There is generally no parity die contention.

The error rate in a super-codeword (super-page) implemented in accordance with an embodiment of the invention becomes more independent and the possibility that the physical pages in different die fail at the same time can be decreased. For example, a super-page with all pages in a border line is avoided. Although the user data is written in a location that is exactly the same as conventional techniques when using the programming method illustrated in FIG. 9, the parity data value is calculated in a different way from the conventional technique. In various embodiments, the read speed is the same when compared to conventional techniques. The user data write speed is the same as the conventional technique (e.g., using the programming method illustrated in FIG. 9) or even faster than the conventional technique (e.g., using the program method illustrated in FIG. 10). Once a row of user data is ready, the user data can be immediately programmed into the flash memory dies and each data page can be written to one of the flash die. Thus buffer space can be reduced. When multiple rows of data arrive at the same time, the parity pages write speed is the same as the conventional technique. If multiple (e.g., J) rows (e.g. 2 or 4 rows) of data do not arrive at the same time, parity data writing could be committed to flash memory once every 2 or 4 rows of data from host arrives. When the rows of user data are written to flash dies, all the J rows (2 or 4) of parity data are partially generated. At the time the last row arrives, all the J rows (2 or 4) of parity data will be completed immediately and will be ready to be written into the flash dies (parity dies). The programming method illustrated in connection with FIG. 9 has 1 page delay for all-bit-line architecture memory. The programming method illustrated in connection with FIG. 10 does not have a delay for the whole data. Also, the programming method illustrated in connection with FIG. 10 does not need additional buffer space.

In various embodiments, the user data is divided, for example, into L non-overlapped sub-parts. However, any partition of the user data into L non-overlapped parts for different L parity data calculation is within the scope of the invention. The techniques in accordance with embodiments of the invention may also be applied to any n-bit cell flash memory (e.g. 3-bit per cell) as far as the pages in the n-bit cell memory can be classified into L types. For example, a 3-bit cell architecture allows classification of pages into LSB, middle-page, and MSB page types. The 3-bit cell architecture can be simplified as {even, odd}×{Upper, middle, lower}, L=6 cases. The L types can also be simplified. For example, an even-odd two-bit cell, can be simplified from L=4 to simply L=2. For example, pages could be classified as even and odd, or pages could be classified as LSB and MSB.

The techniques described herein can be extended to values of L larger than the number of types of pages, yielding additional advantages. The benefits of distributing the pages of a super-page across all of the page types are realizable with a value of L larger than the number of types of pages. For example, with MLC flash and an even-odd architecture, the parity could be distributed across 4, 5, or more rows, achieving similar effects. Of course, the distribution of page types in each super-page is the same if the parity is distributed across a multiple of L rows (e.g., L, 2*L, 3*L, etc.). In the limit, parity could be "barber poled" as illustrated in FIG. 11, where parity is distributed across as many rows as there are dies.

Multi-level cell flash, such as MLC flash and TLC flash, has a potential problem called "lower page corruption" which occurs when there is a power failure while programming a higher level of a cell. A power failure during programming of a higher level potentially corrupts a value that was previously programmed in the lower level(s). Typically, flash pages are programmed in an interleaved fashion so that, for example, page i is the lower page stored in a particular cell, and page i+5 is the upper page. Lower page corruption affects pages that were previously programmed and believed to be good. By distributing the parity across L rows, each parity group only experiences a fraction 1/Lth of the effect of lower page corruption.

While flash pages are programmed sequentially in a given block (e.g., page i is programmed before page i+1), it is not necessary that all dies program the same page number at the same time. For example, different ones of the dies could be "offset" from each other in page programming location, so that, for example, die i is programming page j at a same time as die i+k is programming page j+k. Offsetting the page programming sequence while still computing RAID-like parity horizontally (whether in a single row or across L rows) further mitigates lower page corruption, as the offset moves the lower page corruption effects across different ones of the parity groups.

Referring to FIG. 11, a diagram of a memory array 500 is shown illustrating another programming example in accordance with an embodiment of the invention. In various embodiments, an offset writing scheme (e.g., a barber pole pattern of writes) may be implemented, reducing effects of lower-page corruption. In some embodiments, the controller 82 is configured to implement the barber pole pattern write (offset writing) scheme in combination with a redundancy scheme treating the plurality of memory dies in the NVM media 84 as a redundant array of independent silicon elements to mitigate lower page corruption. Parity is still accumulated horizontally, but user data row writes are staggered across the die in a super-block in a diagonal pattern. In some embodiments, the lower user data rows in a new super-block may be pre-programmed in a staggered fill pattern (e.g., illustrated by hashing) to prime the diagonal (or offset) writing scheme. Depending on how the offset writing scheme is implemented, capacity may be reduced by $(((N-2)*(N-1))/2)/N*M$, but only one lower user data row within any given horizontal super-page can be corrupted. In some embodiments, capacity is maintained by having the diagonal writing scheme simply scroll over at a super-block boundary (e.g., the "filler" indicated by the hashing is part of the user data rows from stripes that started in a previous super-block). By "barber-poling" the super-pages across different die, effects of lower-page corruption may be greatly reduced. The barber poling (or striping) technique mitigates lower page corruption because with barber poling only one lower page in a parity group is susceptible to lower page corruption within a given time window.

The offset writing technique is an optional feature that may be used with or without the techniques described above in connection with FIGS. 4-10. The example embodiment illustrated in FIG. 11 uses the offset write technique with a traditional RAID-like scheme, but would be applicable to any of the RAID-like schemes described above. The offset writing scheme need not be implemented as a full barber pole. For example, when L is large, less offsetting may be sufficient (e.g., shift the offset by 1 every L die instead of every die).

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
a memory comprising a plurality of memory devices, each memory device having a plurality of pages, wherein the plurality of pages in each memory device are classified into a plurality of different types of pages based on error rate variations among the pages in each memory device; and a controller configured to write user data and error-correction data to a super-page of the memory, wherein the super-page comprises a plurality of sub-pages including user data pages and one or more parity data pages, the plurality of sub-pages are written across the plurality of memory devices such that the plurality of sub-pages are stored using two or more types of pages, and calculation of the one or more parity data pages by the controller is divided into a number of portions corresponding to a number of types of pages used to store the sub-pages of the super-page.

2. The apparatus according to claim 1, wherein the plurality of types of pages comprise one or more of upper and lower pages, odd and even pages, and least significant bit and most significant bit pages.

3. The apparatus according to claim 1, wherein adjacent sub-pages of the super-page are stored in different types of pages.

4. The apparatus according to claim 1, wherein the plurality of types of pages are based one or more of physical location within each of the memory devices and logical location in a memory cell.

5. The apparatus according to claim 1, wherein the controller stores the user data pages of the super-page across the plurality of memory devices using a barber pole pattern.

6. The apparatus according to claim 1, wherein the plurality of memory devices comprise one or more flash memory dies.

7. The apparatus according to claim 1, wherein the memory and the controller are part of a solid state drive or disk.

8. The apparatus according to claim 1, wherein the controller writes a row of user data to memory immediately and writes parity data for a plurality of rows of user data simultaneously.

9. A method of distributing data over a plurality of memory devices comprising the steps of:
classifying each of a plurality of pages in each of a plurality of memory devices into a plurality of types of pages, wherein the plurality of types of pages are based on error rate variations among the pages of each memory device;
writing user data and error-correction data to a super-page, wherein the super-page comprises a plurality of sub-pages including user data pages and one or more parity data pages, and the plurality of sub-pages are written across the plurality of memory devices such that the plurality of sub-pages are stored using two or more types of pages; and
calculating the one or more parity data pages in a number of individual portions corresponding to a number of types of pages used to store the sub pages of the super-page.

10. The method according to claim 9, wherein the plurality of types of pages comprise one or more of upper and lower pages, odd and even pages, and least significant bit and most significant bit pages.

11. The method according to claim 9, wherein adjacent sub-pages of the super-page are stored in different types of pages.

12. The method according to claim 9, wherein the plurality of types of pages are based one or more of physical location within each of the memory devices and logical location in a memory cell.

13. The method according to claim 9, wherein the user data is stored across the plurality of memory devices using a barber pole pattern.

14. The method according to claim 9, further comprising writing a row of user data to memory immediately and writing parity data for a plurality of rows of user data simultaneously.

15. An apparatus comprising:
an interface configured to process a plurality of read/write operations to/from a memory comprising a plurality of memory devices with each memory device comprising a plurality of pages, wherein the plurality of pages in each memory device are classified into a plurality of different types based on error rate variations; and
a control circuit configured to write user data and error-correction data to a super-page of the memory, wherein the super-page comprises a plurality of sub-pages including user data pages and one or more parity data pages, the plurality of sub-pages are written across the plurality of memory devices such that the plurality of sub-pages are stored using two or more types of pages, and calculation of the one or more parity data pages by the control circuit is divided into a number of portions corresponding to a number of types of pages used to store the sub-pages of the super-page.

16. The apparatus according to claim 15, wherein the plurality of types of pages comprise one or more of upper and lower pages, odd and even pages, and least significant bit and most significant bit pages.

17. The apparatus according to claim 15, wherein adjacent sub-pages of the super-page are stored in different types of pages.

18. The apparatus according to claim 15, wherein the plurality of types of pages are based one or more of physical location within each of the memory devices and logical location in a memory cell.

19. The apparatus according to claim 15, wherein the super-page contains data from a number of user data rows corresponding to the number of types of pages used to store the super-page.

20. The apparatus according to claim 15, wherein each portion of parity data calculated is stored in a different memory device.

* * * * *